Figure 1:
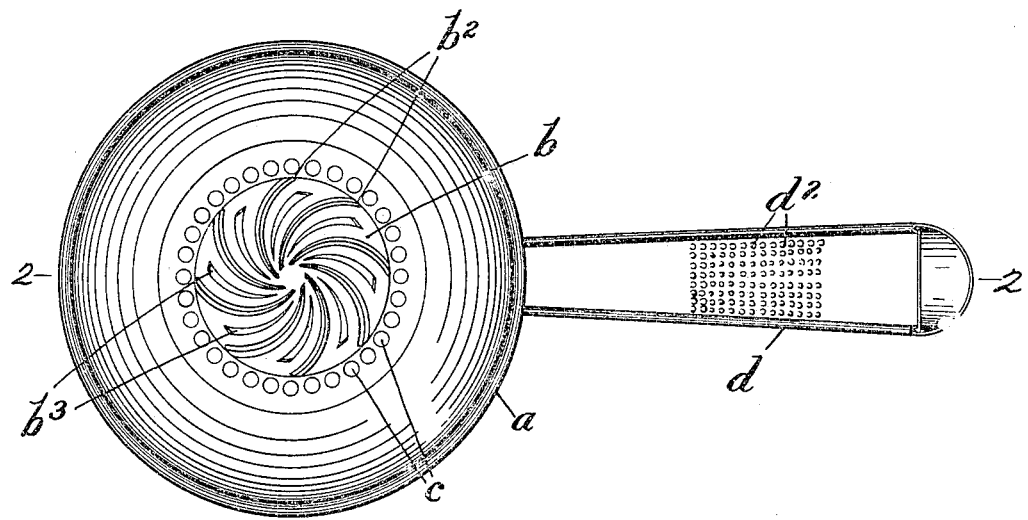

No. 793,189. PATENTED JUNE 27, 1905.
A. GROUNDMAN.
LEMON JUICE EXTRACTOR.
APPLICATION FILED FEB. 13, 1905.

WITNESSES
J. C. Larsen
F. A. Stewart

INVENTOR
Augustus Groundman
BY Edgar Seile & Co
ATTORNEYS

No. 793,189. Patented June 27, 1905.

UNITED STATES PATENT OFFICE.

AUGUSTUS GROUNDMAN, OF NEW YORK, N. Y.

LEMON-JUICE EXTRACTOR.

SPECIFICATION forming part of Letters Patent No. 793,189, dated June 27, 1905.

Application filed February 13, 1905. Serial No. 245,383.

*To all whom it may concern:*

Be it known that I, AUGUSTUS GROUNDMAN, a citizen of the United States, residing at New York, in the county of New York and State of New York, have invented certain new and useful Improvements in Lemon-Juice Extractors, of which the following is a specification, such as will enable those skilled in the art to which it appertains to make and use the same.

This invention relates to devices for extracting the juice of lemons; and the object thereof is to provide an improved device of this class which is also designed to serve as a strainer, a further object being to provide a device of the class specified which may be used as a grater; and with these and other objects in view the invention consists of a device of the class specified constructed as hereinafter described and claimed.

This invention is an improvement on that described and claimed in United States Letters Patent No. 633,997, granted to me October 3, 1899, and is fully disclosed in the following specification, of which the accompanying drawings form a part, in which the separate parts of my improvement are designated by suitable reference characters in each of the views, and in which—

Figure 2:
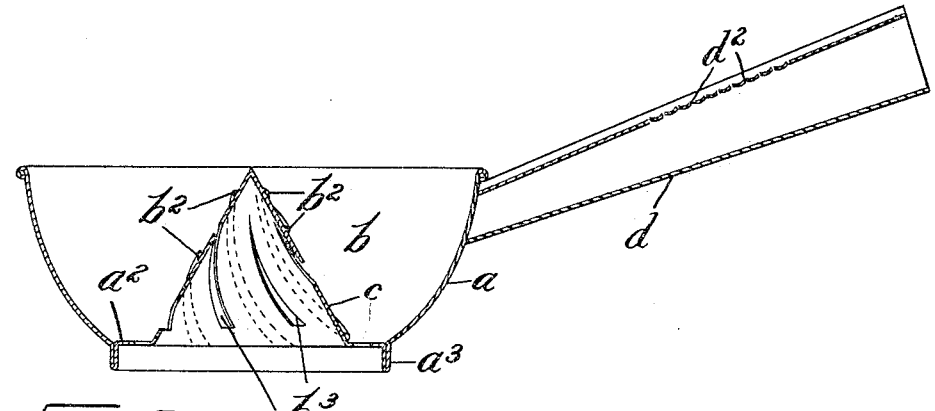

Figure 1 is a plan view of my improved lemon-juice extractor, and Fig. 2 a transverse section thereof on the line 2 2 of Fig. 1.

In the practice of my invention I provide a cup-shaped receptacle $a$, having a flat bottom $a^2$, around which is a depending flange or rim $a^3$, and the bottom $a^2$ is provided centrally with a raised cone-shaped device $b$, which is preferably of about the same height as the receptacle $a$ and around the base of which are perforations $c$. The central cone-shaped device $b$ is provided with spirally-arranged flanges or rims $b^2$, between which are spirally-arranged slots or openings $b^3$, and the receptacle $a$ is provided at one side with a hollow or tubular handle $d$, the top portion of which in the form of construction shown is flat and provided with perforations or holes $d^2$, which form a grating-surface, and by means of this construction the handle $d$ is made to serve as a grater, as will be readily understood.

When it is desired to extract the juice of a lemon, the lemon is divided transversely of its longitudinal axis, the receptacle $a$ is placed on a goblet or similar vessel around which the flange or rim $a^3$ fits or within which said flange or rim may fit, and one-half of the lemon is placed down over the conical device $b$ and turned thereon, pressure being applied by the hand in this operation, and in this manner the juice is extracted from the lemon and flows downwardly through the perforations $c$ and the slots or openings $b^3$, which serve as a strainer into the goblet or other vessel, and the pith and seeds of the lemon are retained in the receptacle $a$.

This device is simple in construction and operation and perfectly adapted to accomplish the result for which it is intended and is also comparatively inexpensive.

Having fully described my invention, what I claim as new, and desire to secure by Letters Patent, is—

A lemon-juice extractor, comprising a cup-shaped receptacle having a central raised conical portion provided with a pointed top and spirally-arranged ribs between which are spirally-arranged slots, the bottom of the receptacle being provided around the base of the conical raised portion with perforations, substantially as shown and described.

In testimony that I claim the foregoing as my invention I have signed my name, in presence of the subscribing witnesses, this 11th day of February, 1905.

AUGUSTUS GROUNDMAN.

Witnesses:
F. A. STEWART,
C. J. KLEIN.